(No Model.) 3 Sheets—Sheet 1.
W. DISCHO.
SPRINKLING POT.
No. 361,143. Patented Apr. 12, 1887.
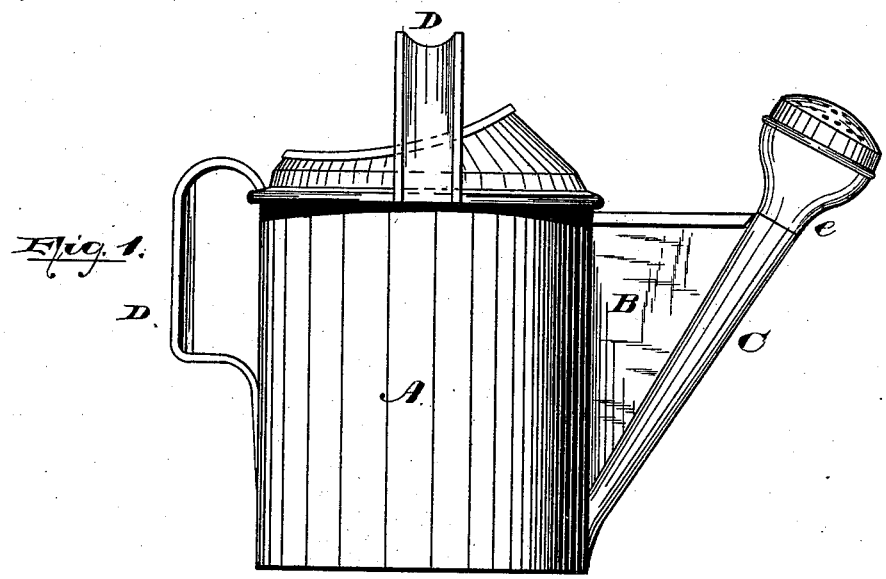
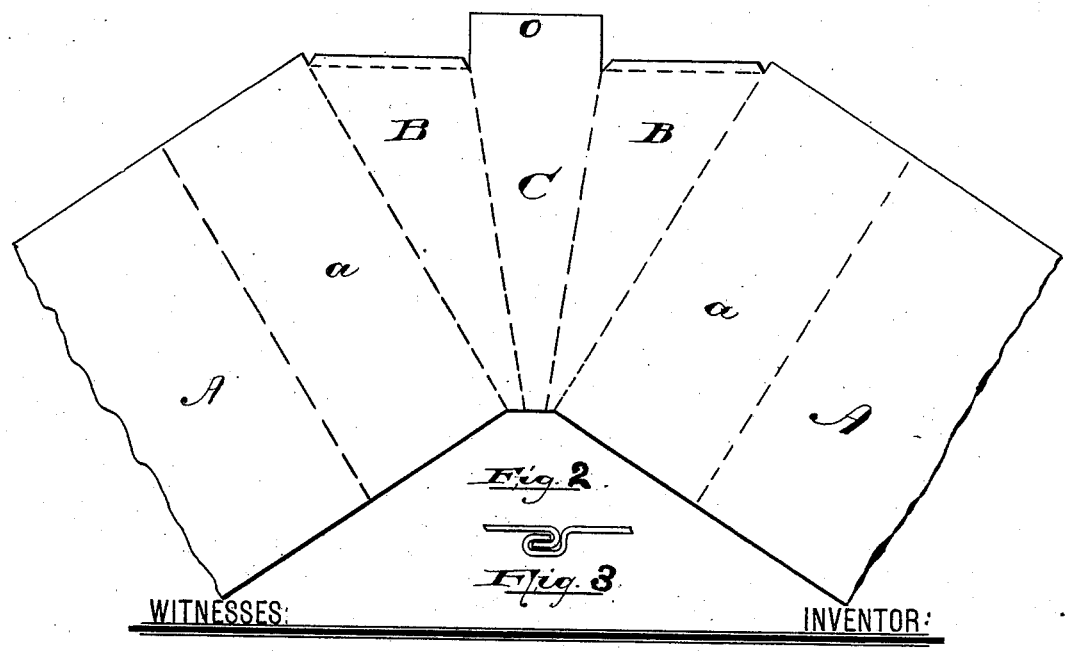
WITNESSES: Frdk. F. Campbell. Oscar A. Michel.
INVENTOR: William Discho, BY Drake & Co. ATTYS.

(No Model.) 3 Sheets—Sheet 2.

W. DISCHO.
SPRINKLING POT.

No. 361,143. Patented Apr. 12, 1887.

WITNESSES: Fredk. F. Campbell, Oscar A. Michels

INVENTOR Wm Discho, BY Drake & Co. ATTYS.

(No Model.) 3 Sheets—Sheet 3.

W. DISCHO.
SPRINKLING POT.

No. 361,143. Patented Apr. 12, 1887.

WITNESSES: Frdk. F. Campbell, Oscar A. Michel

INVENTOR: William Discho,
BY Drake & Co. ATTYS.

United States Patent Office.

WILLIAM DISCHO, OF NEWARK, NEW JERSEY, ASSIGNOR TO THE IRON CLAD MANUFACTURING COMPANY, OF NEW YORK, N. Y.

SPRINKLING-POT.

SPECIFICATION forming part of Letters Patent No. 361,143, dated April 12, 1887.

Application filed March 13, 1886. Serial No. 195,064. (No model.)

*To all whom it may concern:*

Be it known that I, WILLIAM DISCHO, a citizen of the United States, residing at Newark, in the county of Essex and State of New Jersey, have invented certain new and useful Improvements in Sprinkling-Pots; and I do hereby declare the following to be a full, clear, and exact description of the invention, such as will enable others skilled in the art to which it appertains to make and use the same, reference being had to the accompanying drawings, and to letters of reference marked thereon, which form a part of this specification.

The invention relates to a particular construction of the body, spout, and connecting-web of a single piece of metal.

The invention consists in a sprinkling-pot having its body, spout, and connecting-web constructed of a single sheet of metal bent to shape and having a single seam along the longitudinal front edge of the spout for uniting the parts, the web being seamed at its upper edge in any suitable manner.

The invention also consists in a sprinkling-pot substantially so constructed, having its spout provided with a prolongation for the reception of the rose, all and severally as hereinafter particularly set forth and claimed.

Figure 4:
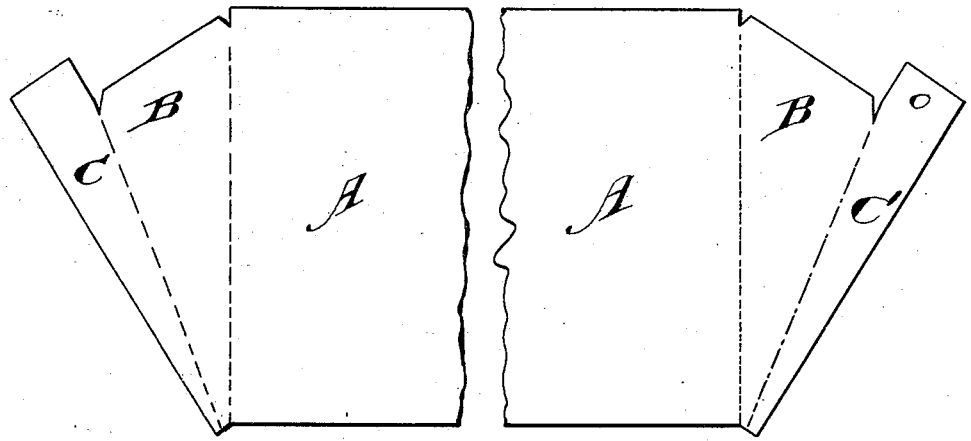
Figure 5:
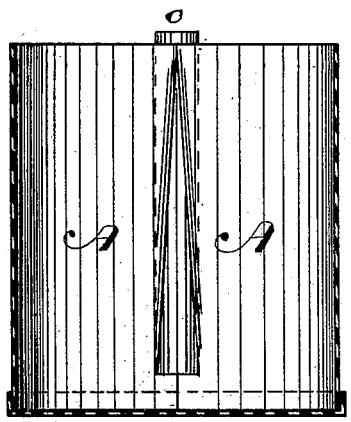
Figure 6:
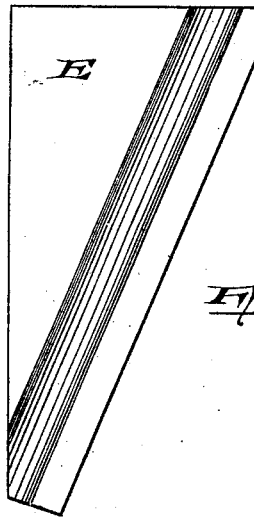
Figure 7:
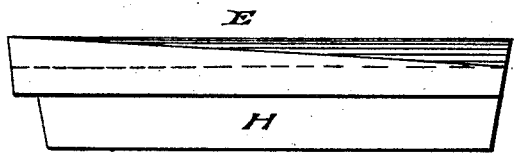
Figure 9:
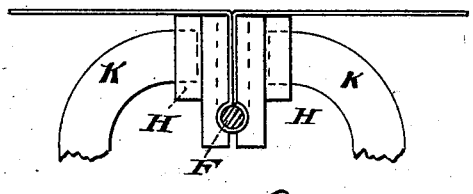
Figure 8:
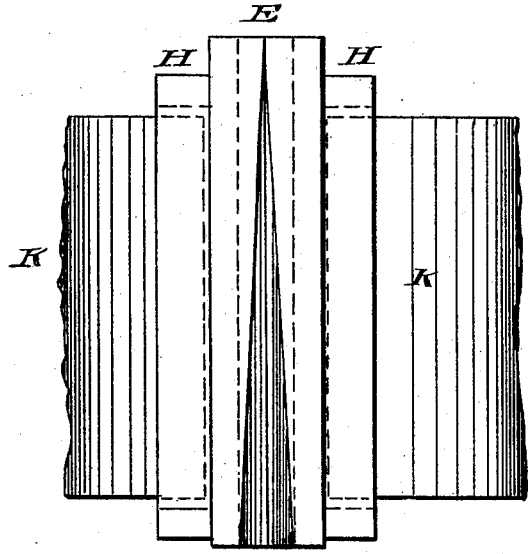

In the accompanying drawings, in the several figures of which like parts are similarly designated, Figure 1 is a side elevation of a sprinkling-pot embodying my invention. Fig. 2 is a diagram of one form of blank for constructing this vessel. Fig. 3 is a view of the seam which may be used in uniting the ends of the blank. Fig. 4 is a diagram of the preferred form of watering-pot blank. Fig. 5 is a vertical cross-section of the body and spout of a watering-pot made from the blank shown in Fig. 4; and Figs. 6, 7, 8, and 9 are views of the apparatus which may be employed for forming the spout.

The body A, web B, and spout C are of substantially ordinary form, but constructed of a single sheet of metal with a uniting seam longitudinally of the body and another seam arranged at the top of the web. The usual handles, D D, and breast E may be applied, and also a rose, *e*. The blank (see Figs. 2 and 4) is provided with an extension, *o*, which forms a prolongation of the spout beyond the web, to afford a seat for the rose.

As shown in Fig. 1, the seam may be at the rear of the body; but in the preferred form shown in Figs. 4 and 5 the seam is made longitudinally of the spout, and is therefore at the front of the vessel.

The portion of the metal forming the web B and spout C may be pressed into the required shape between dies or formers, substantially such as are shown in Figs. 6 to 9, inclusive, a mandrel being first inserted or laid upon the metal at the desired place, of the shape and size of the inside or opening of the spout, by means of which said opening is formed. The web or brace B is thus composed of two layers of sheet metal pressed closely together at the top, thereby forming a firm support or stay for the spout on the cylindrical portion of the sprinkling-pot.

The body A of the vessel may be formed between ordinary rolls or in any other preferred manner.

The form and construction of the formers or dies, when such are used, may and of course must be varied to conform to such variations as may be made in the size or forms of the vessels for which they may be required.

While in many respects the sprinkling-pot is most economically formed with a back seam, still, when the vessel is made of tin and the saving of stock in cutting out the blank is thought to be of more importance than the location of the seam, the seam may be along the spout, as shown in Fig. 4. Of course this blank will be varied or modified in accordance with any variations of form or size of the vessels, as will be understood.

I do not broadly claim a sheet-metal vessel wherein the spout and the web or brace connecting and securing the spout to the body are composed of a single piece of metal; neither do I claim a sheet-metal vessel whose body, spout, and intermediate brace or web are formed from a single piece of material bent to shape and united at its ends.

Obviously my invention is applicable to sheet-metal vessels other than sprinkling-pots.

What I claim is—

1. A sheet-metal vessel comprising a body, spout, and connecting-brace made of a single piece of metal united by a seam extending along the front edge of the spout, substantially as described.

2. A sheet-metal vessel having its body, spout, and connecting-brace made of a single piece of metal united substantially as set forth, and provided with a prolongation, o, of the spout to form a seat for the rose or nozzle, substantially as described.

In testimony that I claim the foregoing I have hereunto set my hand this 10th day of February, 1886.

WILLIAM DISCHO.

Witnesses:
OLIVER DRAKE,
OSCAR A. MICHEL.